United States Patent [19]

Davis et al.

[11] 4,362,644

[45] Dec. 7, 1982

[54] ARYLALKYL SILICONE SULFONATE-SILICATE COPOLYMERS

[75] Inventors: Pauls Davis, Gibraltar; Joe C. Wilson, Woodhaven, both of Mich.

[73] Assignee: BASF Wyandotte Corporation, Wyandotte, Mich.

[21] Appl. No.: 250,087

[22] Filed: Apr. 1, 1981

[51] Int. Cl.$^3$ .............................................. C07F 7/08
[52] U.S. Cl. .............................. 252/389 R; 556/428; 568/701; 252/78.3; 422/14
[58] Field of Search ............... 556/428; 568/701; 252/389 R, 78.3; 422/14

[56] References Cited

U.S. PATENT DOCUMENTS

| | | | |
|---|---|---|---|
| 2,968,643 | 1/1961 | Bailey | 556/428 X |
| 3,215,643 | 11/1965 | Pail | 556/428 X |
| 3,328,449 | 6/1967 | Haluska | 556/428 X |
| 3,337,496 | 2/1967 | Pines et al. | 260/46.5 |
| 3,341,469 | 9/1967 | Pines et al. | 252/389 R |
| 3,412,129 | 11/1968 | Holdstock | 556/428 |
| 3,418,352 | 12/1968 | Rossmy | 556/428 |
| 3,707,492 | 12/1972 | Morehouse | 556/428 |
| 3,931,265 | 1/1976 | Sias | 556/428 X |
| 3,948,963 | 4/1976 | Rossmy | 556/428 |
| 3,997,580 | 12/1976 | Morehouse | 556/428 |

*Primary Examiner*—Paul F. Shaver
*Attorney, Agent, or Firm*—Andrew E. Pierce

[57] ABSTRACT

Novel arylalkyl silicone sulfonate-silicate copolymers are disclosed which are useful in inhibiting the corrosion of metals below sodium in the electromotive series that come in contact with aqueous liquids, especially aqueous alcohol solutions used as heat transfer media. Antifreeze concentrates and a process for inhibiting corrosion are also disclosed.

13 Claims, No Drawings

ARYLALKYL SILICONE SULFONATE-SILICATE COPOLYMERS

BACKGROUND OF THE INVENTION

1. Field of the Invention

The invention relates to corrosion-inhibited aqueous solutions, particularly antifreeze compositions useful as coolants in a heat-exchange system such as the cooling system of an internal combustion engine.

2. Prior Art

Bailey in U.S. Pat. No. 2,968,643 disclose sulfo-aralkyl siloxanes and salts thereof and a process for their production. In U.S. Pat. No. 3,215,643, the sulfo-siloxanes of Bailey are disclosed as useful when copolymerized with a conventional siloxane in the foaming of solvents. Organosiloxane-silicate copolymers have been disclosed in U.S. Pat. No. 3,341,469 and U.S. Pat. No. 3,337,496 by Pines et al as useful in the inhibition of the corrosion of metals below sodium in the electromotive series that come in contact with aqueous liquids. Other siloxane-silicate copolymers are disclosed in U.S. Pat. Nos. 3,312,622; 3,198,820; 3,203,969; and 3,248,329. Silicone-sulfonate compositions are also disclosed in U.S. Pat. No. 3,507,897.

SUMMARY OF THE INVENTION

Novel arylalkyl silicone sulfonate-silicate copolymers are disclosed which are useful in a process for inhibiting the corrosion of metals below sodium in the electromotive series that come in contact with aqueous liquids, particularly aqueous alcohol compositions. The novel corrosion inhibitors can be prepared in situ at ambient temperature and pressure by providing to an aqueous alcohol solution appropriate amounts of a conventional water-soluble silicate and an arylalkyl silicone sulfonate. The novel copolymers provide long lasting corrosion inhibition and superior corrosion protection as compared to organosiloxane-silicate copolymers of the prior art. The novel copolymers of the invention provide improved long term gel stabilization of water-soluble silicates which are useful as corrosion inhibitors for metals in contact with aqueous liquids.

DETAILED DESCRIPTION OF THE INVENTION

The novel arylalkyl silicone sulfonate-silicate copolymers of the invention can be prepared in situ by reacting an arylalkyl silicone sulfonate with a water-soluble silicate under ambient or elevated conditions of temperature and ambient pressure in an aqueous medium. Preferably, the reaction is conducted in the presence of a water-soluble alcohol comprising ethylene glycol which is utilized in the preparation of a heat transfer medium for the cooling system of an internal combustion engine.

The arylalkyl silicone sulfonate-silicate copolymers utilized in the invention contain from 0.1 to 99.9 parts by weight of at least one silicone sulfonate group member derived from silicone sulfonates of the formula:

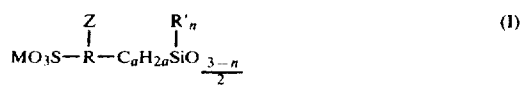

wherein Z is at least one of a hydrogen atom, a monovalent alkyl group having 1 to about 8 carbon atoms, a monovalent aryl group or alkyl substitued aryl group having up to 10 carbon atoms in the aryl group and 1 to about 8 carbon atoms in the alkyl group, or a monovalent group having any of the formulas:

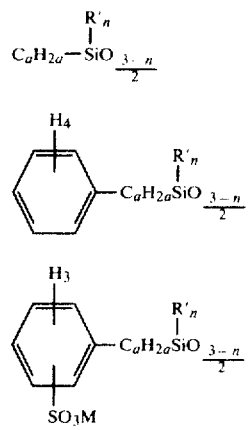

wherein said groups are connected to R through a carbon to carbon linkage. R is a divalent or trivalent aryl group containing up to and including 10 carbon atoms, R' is an alkyl group having 1 to about 8 carbon atoms, a is an integer of from 2 to 4 so as to provide that said aryl group is connected to the silicon atom through at least two carbon atoms, n is an integer of from 0 to 2, and M is a monovalent, divalent, or trivalent cation preferably selected from the group consisting of at least one of hydrogen, alkali metal, tetraorganoammonium, and ammonium.

Illustrative of such arylalkyl silicone sulfonates are β-(sodium sulfophenyl)ethylpolysiloxane having the structural formula:

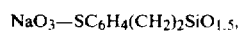

β-(sodium sulfonaphthyl)ethylpolysiloxane having the structural formula:

and γ-(sodium sulfophenyl)propylpolysiloxane having the structural formula:

The arylalkyl silicone sulfonates can be prepared by several different processes. Among these processes are the hydrolysis of the corresponding chlorosulfonylaralkyl siloxane and the sulfonation of an aralkyl silicone compound with a sulfonating agent such as fuming sulfuric acid or sulfur trioxide. Additional representative examplss of the arylalkyl silicone sulfonates and detailed processes for their preparation can be found in U.S. Pat. No. 2,968,643, incorporated herein by reference.

The water-soluble silicates which are useful in the preparation of the arylalkyl silicone sulfonate-silicate copolymers of the invention can be represented by the average formula:

wherein X is a cation that forms a water-soluble silicate such as an alkali metal, ammonium, or tetraorganoammonium cation (silicic acid, where X is hydrogen, can also be used), d is the valence of X and is at least 1 and e has a value from 1 to 3, or preferably from 1.0 to 2.5. The silicone sulfonate-silicate copolymers of the invention contain from 0.1 to 99.9 parts by weight of at least one silicate group member derived from said water-soluble silicate. Preferably, the copolymers of the invention contain about 5 to about 45 parts by weight of silicone sulfonate groups and about 55 to about 95 parts by weight of silicate groups and, most preferably, about 15 to about 25 parts by weight of silicone sulfonate groups and about 75 parts to about 85 parts by weight of silicate groups, all based upon 100 parts by weight of said copolymer. Illustrative of these silicates are the alkali metal orthosilicates, the alkali metal metasilicates, the alkali metal tetrasilicates, the alkali metal disilicates, and the tetraorgano ammonium silicates. Specific examples of these silicates are potassium metasilicate, sodium orthosilicate, sodium disilicate, lithium orthosilicate, lithium metasilicate, lithium disilicate, rubidium disilicate, ribidium tetrasilicate, mixed silicates, tetra(methyl)ammonium silicate, tetra(ethyl)ammonium silicate, phenyltrimethylammonium silicate, benzyltrimethylammonium silicate, guanidine silicate, and tetra(hydroxyethyl)ammonium silicate. The preferred silicates are sodium and potassium silicates, especially sodium metasilicate and potassium metasilicate.

In preparing the copolymers of the invention, the starting silicate can be added to the reaction mixture as such or it can be formed in situ by adding the appropriate hydroxide, for instance, sodium or potassium hydroxide, and silica to the reaction mixture. The temperature at which the arylalkyl silicone sulfonate and silicate are maintained in the reaction mixture to produce the copolymers of this invention can vary widely. Temperatures from 20° C. to 150° C. at ambient pressures can be used. However, temperatures from 20° C. to 115° C. are preferred. The use of other temperatures or pressures is generally undesirable since no advantage is gained thereby.

The formation of the copolymers of this invention provide a means of stabilizing the gel-forming tendencies of water-soluble silicates in aqueous liquids, for instance, alcohol solutions such as solutions of ethylene glycol utilized in the preparation of antifreeze compositions. The arylalkyl silicone sulfonate-silicate copolymer does not gel after extended heating at 180° F. in an aqueous solution such as an aqueous solution containing an alcohol, for instance, ethylene glycol (an antifreeze coolant or antifreeze concentrate) as is the case with a water-soluble silicate. As a consequence of the retention of the water-solubility properties of the copolymer of the invention, aqueous alcohol solutions containing the copolymers of the invention cause remarkably less corrosion than water-soluble silicate inhibited aqueous alcohol solutions which makes the former admirably suited as non-corrosive coolants for use in the cooling system of internal combustion engines.

Alternatively, the copolymers of this invention can be used as corrosion inhibitors by adding the previously formed copolymer to an aqueous liquid and uniformly dispersing the copolymer throughout the liquid. Any suitable means can be used to disperse the copolymer throughout the liquid. Thus, in the case of moving liquids that are in contact with the metal to be protected, the copolymer can be added to the liquid while the liquid is in use and dispersion of the copolymer throughout the liquid can be achieved by the movement of the liquid. However, the copolymer can be added to the liquid prior to the use of the liquid in contact with the metal to be protected and the copolymer can be dispersed throughout the liquid by stirring the liquid. This latter procedure is preferred where the liquid is to be stored or where the liquid undergoes little movement when in use such as in the case of the preparation of antifreeze concentrates. This method is in contrast to the preparation of the copolymers of this invention in situ as described above.

When the silane precursors of the arylalkyl silicone sulfonate are added to an aqueous liquid together with a water-soluble silicate to produce the siloxane and the copolymer in situ, the precursor silane is converted to the siloxane by hydrolysis when mixed with water even at ambient temperature. The silane precursors to the arylalkyl siloxane sulfonates can contain alkoxy groups attached to the silicon atom, for instance, methoxy, ethoxy, propoxy, or butoxy groups. The reaction of the silane and water-soluble silicate is catalyzed by the presence of the water-soluble silicate. The arylalkyl siloxane sulfonates so formed then react with the water-soluble silicate. Should it be desired to isolate the copolymer, distillation of the aqueous medium or aqueous alcohol medium can be used to concentrate the copolymer.

The copolymers of this invention are generally useful in a corrosion inhibiting amount for the protection of metals that come into contact with an aqueous liquid. The amount of the copolymers of this invention used in inhibiting corrosion of metals in contact with aqueous liquids is dependent upon the temperature, type of metal or metals being protected, type of any organic liquid in the solution, pH of the aqueous liquid, velocity of the aqueous liquid, inorganic solutes (e.g. electrolytes such as chlorides, sulfates and bicarbonates) in the aqueous liquid and prior corrosion treatment or corrosion state of the metal. Generally, about 0.125 part to about 4 parts by weight, preferably about 0.25 part to about 1.25 parts by weight, and most preferably about 0.75 part to about 1.0 part by weight of said copolymer is used, all based upon 100 parts by weight of inhibited aqueous liquid such as an antifreeze concentrate or coolant composition.

Suitable aqueous liquids are pure water, aqueous solutions containing inorganic solutes and solutions containing water and water-soluble organic compounds, especially water soluble or miscible organic liquids. Illustrative of suitable aqueous solutions containing inorganic solutes are aqueous sodium or potassium chloride refrigerating solutions, corrosive well water or river water containing chlorides, carbonates and sulfates which may be used as process or cooling water in industry, and the like. Illustrative of suitable solutions are those containing water and monohydric or polyhydric alcohols (e.g., methanol, ethanol, propanol, ethylene glycol, propylene glycol and glycerol), hydroxyl and alkoxy end-blocked polyalkylene oxides (such as hydroxyl end-blocked polyethylene oxide), sulfoxides (such as methylsulfoxide), formamides (such as dimethylformamide) or cyclic ethers free of olefinic unsaturation (such as tetrahydrofuran, dioxane and the like). Suitable solutions containing water and a water-soluble organic liquid should contain at least 0.1 part by weight, or preferably, at least 5.0 parts by weight of water per 100 parts by weight of the total of the water and the organic liquid.

The copolymers of this invention are generally useful in the protection of all metals and alloys that are used in industrial processes and apparatus. Metals whose corrosion is retarded by the copolymers of this invention include the metals below sodium in the electromotive series (e.g. magnesium, aluminum, copper, iron, manganese, nickel, lead, silver, tin, beryllium and zinc) as well as the alloys of such metals (e.g. brass, bronze, solder alloys, steel and the like). Such metals are solids at 25° C. and normally become corroded when in prolonged contact with water, particularly when the water is at elevated temperatures and/or contains electrolytes (e.g. acidic solutes). The copolymers of this invention are particularly useful in the protection of brass, iron, copper and aluminum.

Compared with known inhibitors used in preventing corrosion of metals that are in contact with water, the copolymers of this invention provide numerous advantages. Thus, the copolymers can be added to a wide variety of aqueous solutions and inhibit the corrosion of a wide variety of metals. In addition, the copolymers are effective over a wide temperature range and these inhibitors do not cause the liquids in which they are employed to foam excessively. Furthermore, these copolymers do not promote the decomposition of any organic liquids present in the liquid nor do they attack other organic materials with which the liquid may come in contact.

The copolymers of this invention are useful in preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The copolymers of this invention are particularly useful for inhibiting the corrosion of the cooling systems of internal combustion engines in contact with aqueous alcohol coolant compositions.

Inhibited alcohol compositions, such as antifreeze concentrates, containing an alcohol and a copolymer of this invention as a corrosion inhibitor are remarkably useful as antifreezes and coolants for the cooling systems of internal combustion engines. These antifreeze concentrates are inhibited alcohol solutions containing relatively small amounts of water and these coolants are inhibited alcohol solutions containing relatively large amounts of water. The antifreeze concentrates are adapted to economical shipment and storage and the coolants are adapted to use, as such, as heat transfer media in the cooling systems of internal combustion engines. In practice, the concentrate can be shipped to the point where it is to be added to the cooling system and there it can be diluted to form a coolant. Water imparts desirable properties to both the concentrate and coolant compositions (e.g. small amounts of water serve to increase the solubility of the inhibitor components of the concentrate compositions and large amounts of water impart good heat transfer properties to the coolant compositions). These compositions generally contain from 1 part by weight to 900 parts by weight of water per 100 parts by weight of the antifreeze concentrate. It is preferable that the coolant compositions contain from 30 to 900 parts by weight of water per 100 parts by weight of the antifreeze concentrate. Generally, the concentrates contain from 1.0 part to 10 parts by weight (or preferably from 2 parts to 7 parts by weight) of water per 100 parts by weight of the antifreeze concentrate. The relative amount of water and alcohol in these compositions can be varied to lower the freezing point of the compositions by the desired amount. Preferably about 85 to about 97 percent by weight of the antifreeze concentrate is ethylene glycol and up to 10 percent by weight of the total weight of said concentrate is diethylene glycol. Most preferably, about 90 percent to about 95 percent by weight is ethylene glycol and 2 percent to about 7 percent by weight is diethylene glycol, all based upon the total weight of said concentrate.

The pH of the inhibited aqueous alcohol compositions of this invention should be greater than seven to minimize corrosion of metals with which the compositions come in contact. Generally, the pH of the antifreeze concentrate or coolant composition is about 8 to about 12, preferably about 8 to about 11 and most preferably about 8.5 to about 10. The pH is maintained within the above pH ranges by the addition of conventional pH buffers such as salts of strong bases and weak acids, as are disclosed in U.S. Pat. No. 3,121,692, incorporated herein by reference.

In desired, various additives can be added to the above-described inhibited alcohol compositions in particular instances for imparting special properties. By way of illustration, anti-foam agents, identifying dyes, pH indicators, conventional corrosion inhibitors, alkaline pH buffers, sealants which prevent leakage of the coolant from the cooling system, anti-creep agents which prevent seepage of the coolant into the crankcase, and the like can be added to these compositions.

Conventional corrosion inhibitors and/or alkaline pH buffers which can be used under aqueous alkaline conditions in combination with the copolymer corrosion inhibitors of the invention include water-soluble metal salts such as the alkali metal carbonates, borax, the alkali metal dichromates, the alkali metal phosphates, the alkali metal tungstates, the alkali metal salts of benzoic or toluic acid, the alkali metal salts or phenol, benzotriazole or tolyltriazole, lower alkanolamines ($C_2$–$C_6$), for instance, triethanolamine, alkali metal nitrates, alkali metal nitrites, alkali metal molybdates, and alkali metal mercaptobenzothiazoles. Generally, such conventional corrosion inhibitors are used under alkaline conditions in an amount effective to inhibit corrosion. Generally, conventional corrosion inhibitors are used in the amount of about 0.03 part to about 5 parts by weight, preferably about 0.1 to about 2 parts by weight per 100 parts total weight of the antifreeze concentrate.

Useful antifoam agents are the alkoxylated nonionic surfactants which exhibit low-foaming characteristics. Examples of alkoxylated nonionic synthetic detergents which can be advantageously employed as antifreeze agents in the antifreeze compositions of the invention include polyoxyalkylene adducts of hydrophobic bases, as illustrated by PLURONIC ®L-61. Typical hydrophobic bases which can be condensed with alkylene oxides are the mono- and polyalkylphenols and the compounds prepared by condensing polyoxypropylene with a hydrophobic base initiator having from about 1 to 6 carbon atoms and at least one reactive hydrogen atom. Additional useful defoamers based upon nonionic surfactants are disclosed in U.S. Pat. No. 3,931,029, incorporated herein by reference. Useful water-pump lubricants are known in the prior art. The above-described additives can be incorporated in any convenient manner, e.g., by adding to a mixture of an alcohol, the silicone-sulfonate-silicate inhibitor and water in a container and stirring the additives into the mixture.

Many antifreeze concentrates and coolant compositions can be formulated in accordance with the teaching of the present invention. The compositions described below are merely representative of antifreeze concentrates or coolant compositions contemplated by the invention. Where not otherwise specified throughout this specification and claims, temperatures are given in degrees centigrade and parts, percentages, and proportions are by weight.

The effectiveness as metal corrosion inhibitors of the copolymers of the invention is a function of the retention of the solubility characteristics of the copolymer in an aqueous media, i.e., to remain effective, the copolymers must not precipitate or form gels during the effective life of the inhibited aqueous media.

Test Method

In order to demonstrate the effectiveness of the arylalkyl silicone sulfonates as gel stabilizers for aqueous solutions of water-soluble silicates, the copolymers of the invention were formed by mixing, at ambient temperature and pressure, arylalkyl silicone sulfonates with water-soluble silicates in a mixture of an antifreeze concentrate consisting of distilled water and antifreeze grade ethylene glycol. Samples of these antifreeze concentrates were placed in sealed glass jars, aged at a temperature of 180° F. and a pH of 8 over a period of about 2 weeks, and observed for the appearance of gelation. As a means of judging the effectiveness of the siloxanes of the invention as gel stabilizers for water-soluble silicate solutions, the structurally closest siloxanes were utilized as controls in separate concentrates. Each of the sample concentrates were run in triplicate and contained 3 percent by weight distilled water, 0.4 percent by weight of sodium metasilicate ($Na_2SiO_3.5H_2O$), the calculated amount of siloxane in weight percent, as noted below, so as to provide an equimolar amount in comparison with the control sample, and the balance antifreeze grade ethylene glycol which contains about 5 percent diethylene glycol. The silicate is in the form $NaOSiO_{1.5}$ in aqueous solution.

EXAMPLE 1

(Control, forming no part of this invention)

Phenylethyl siloxane was utilized in the amount of 0.15 weight percent (0.93 mole) in the antifreeze concentrate described above under "Test Method". The sample immediately formed an insoluble product preventing evaluation of gel stability after aging at 180° F.

EXAMPLE 2

(Control, forming no part of this invention)

Phenylethyl siloxane was utilized in the amount of 0.024 weight percent (1.86 mole) in the antifreeze concentrate described above under "Test Method". The sample formed insoluble products upon preparation thus preventing evaluation of gel stability at 180° F.

EXAMPLE 3

(Control forming no part of this invention)

Phenylsiloxane was utilized in the amount of 0.024 weight percent (1.86 mole) in the antifreeze concentrate described above under "Test Method". The samples remained gel free after two weeks at 180° F.

EXAMPLE 4

(Control forming no part of this invention)

β-Sodium carboxyethyl siloxane was utilized in the amount of 0.04 weight percent (2.72 moles) in the antifreeze concentrate described above under "Test Method". The samples gelled after 1 week at 180° F.

EXAMPLE 5

β-(Sodium sulfophenyl)ethyl siloxane was utilized in the amount of 0.024 weight percent (0.93 mole) in the antifreeze concentrate described above under "Test Method". The samples showed no gelation after two weeks at 180° F.

EXAMPLE 6

Example 5 was repeated except that the siloxane was utilized in the amount of 0.048 weight percent (1.86 moles). After two weeks at 180° F., the samples showed no sign of gelation.

EXAMPLE 7

β-(sodium sulfophenyl)propyl siloxane in the form

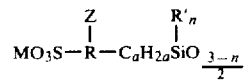

is used in the procedure of Example 6 to replace β-(sodium sulfophenyl)ethyl siloxane. No gel is formed.

While this invention has been described with reference to certain specific embodiments, it will be recognized by those skilled in this art that many variations are possible without departing from the scope and spirit of the invention and it will be understood that it is intended to cover all changes and modifications to the invention disclosed herein for the purposes of illustration which do not constitute departures from the spirit and scope of the invention.

The embodiments of the invention in which an exclusive privilege or property is claimed are defined as follows:

1. A copolymer consisting essentially of from 0.1 to 99.9 parts by weight of at least one group member selected from the group consisting of at least one silicone sulfonate group member derived from silicone sulfonates having the formula:

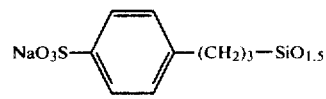

wherein Z is selected from the group consisting of at least one of an hydrogen atom, an alkyl group, an aryl group and a group having any of the formulas:

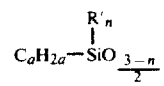

-continued

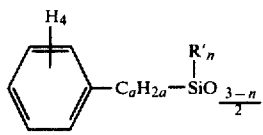

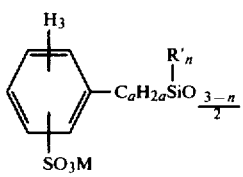

wherein each of the groups represented by the above formulas are monovalent groups connected to R through a carbon to carbon linkage, R is a divalent or trivalent aryl group containing up to and including 10 carbon atoms, R' is an alkyl group, a is an integer of from 2 to 4, n is an integer of from 0 to 2, and M is a monovalent, divalent, or trivalent cation; and from 0.1 to 99.9 parts by weight of at least one silicate group member represented by the formula:

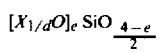

wherein X is a cation that forms a water-soluble silicate; d is the valence of the cation represented by X and has a value of at least one; and e has a value from 1 to 3 inclusive; said parts by weight of said groups in said copolymer being based upon 100 parts by weight of said copolymer.

2. The copolymer of claim 1 wherein said silicone sulfonate groups are present in said copolymer in an amount from about 5 to about 45 parts by weight and wherein said silicate groups are present in said copolymer in an amount of from about 55 to about 95 parts by weight, said parts in said copolymer being based upon 100 parts by weight of said copolymer and wherein M is selected from the group consisting of at least one alkali metal, ammonium, hydrogen, and tetraorganoammonium cation and X is selected from the group consisting of at least one alkali metal, ammonium, and tetraorganoammonium cations.

3. The copolymer of claim 2 consisting essentially of about 15 to about 45 parts by weight of said silicone sulfonate units and about 55 to about 85 parts by weight of silicate groups derived from an alkali metal silicate having the formula:

4. The copolymer of claim 2 wherein said silicone sulfonate has the formula:

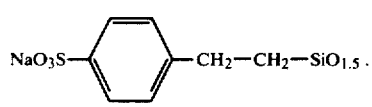

5. The copolymer of claim 2 wherein said silicone sulfonate has the formula:

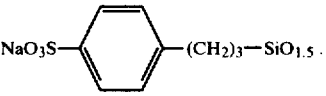

6. An improved inhibited aqueous alcohol composition comprising water, an alcohol, and a corrosion inhibiting amount of a copolymer consisting essentially of from 0.1 to 99.9 parts by weight of at least one group member selected from the group consisting of at least one silicone sulfonate group member derived from silicone sulfonates having the formula:

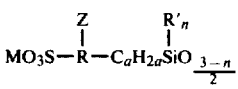

wherein Z is selected from the group consisting of at least one of a hydrogen atom, an alkyl group, an aryl group and a group having any of the formulas:

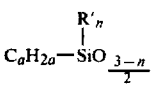

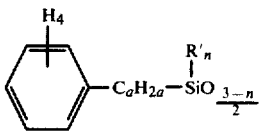

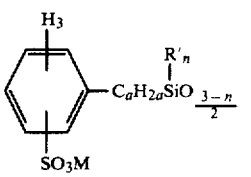

wherein each of the groups represented by the above formulas are monovalent groups connected to R through a carbon-to-carbon linkage, R is a divalent or trivalent aryl group containing up to and including 10 carbon atoms, R' is an alkyl group, a is an integer of from 2 to 4, n is an integer of from 0 to 2, and M is a monovalent, divalent, or trivalent cation; and from 0.1 to 99.9 parts by weight of at least one silicate group member represented by the formula:

wherein X is a cation that forms a water-soluble silicate; d is the valence of the cation represented by X and has a value of at least one; and e has a value from 1 to 3 inclusive; said parts by weight of said groups in said copolymer being based upon 100 parts by weight of said copolymer.

7. A process for inhibiting the corrosion of metals below sodium in the electromotive series that come in contact with an aqueous liquid, said process comprising adding to said liquid a corrosion inhibiting amount of the copolymer of claim 1.

8. The process of claim 7 wherein said metal is iron and said aqueous liquid comprises an aqueous ethylene glycol solution.

9. The process of claim 7 wherein said metal is aluminum and said aqueous liquid comprises an aqueous ethylene glycol solution.

10. The process of claim 7 wherein said copolymer contains an amount of about 5 to about 45 parts by weight of said silicone sulfonate groups and wherein said copolymer contains an amount of said silicate of about 55 to about 95 parts by weight, said parts being based upon 100 parts by weight of said copolymer.

11. The process of claim 10 wherein said copolymer contains groups derived from a silicone sulfonate having the formula:

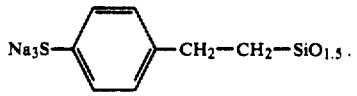

12. The process of claim 10 wherein said copolymer contains silicone sulfonate groups having the formula:

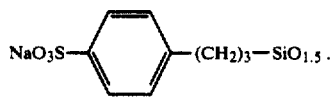

13. The composition of claim 6 wherein said alcohol comprises a mixture of ethylene glycol and diethylene glycol.

* * * * *